United States Patent
Driesch, Jr. et al.

(10) Patent No.: US 11,372,886 B2
(45) Date of Patent: Jun. 28, 2022

(54) METHOD TO DYNAMICALLY DETECT OBJECTS OUT OF SYNC IN AN ACTIVE MIRRORING ENVIRONMENT

(71) Applicant: International Business Machines Corporation, Armonk, NY (US)

(72) Inventors: Robert D. Driesch, Jr., Rochester, MN (US); Robert V. Downer, Rochester, MN (US); Mi Huynh, Rochester, MN (US); John D. Dietel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 16/449,244

(22) Filed: Jun. 21, 2019

(65) Prior Publication Data

US 2020/0401603 A1  Dec. 24, 2020

(51) Int. Cl.
*G06F 15/16* (2006.01)
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
CPC .............................. G06F 16/27; G06F 16/2365
See application file for complete search history.

(56) References Cited

U.S. PATENT DOCUMENTS

| | | | |
|---|---|---|---|
| 7,404,103 B2 | 7/2008 | Chai et al. | |
| 9,330,106 B2 | 5/2016 | Piasecki et al. | |
| 2009/0228494 A1* | 9/2009 | Beichter | G06F 16/2343 |
| 2015/0088830 A1* | 3/2015 | Kamp | G06F 11/2058 |
| | | | 707/648 |
| 2016/0350352 A1* | 12/2016 | Hase | G06F 12/084 |
| 2017/0161313 A1* | 6/2017 | Ritter | G06F 16/2365 |
| 2019/0138342 A1 | 5/2019 | Dornemann et al. | |

* cited by examiner

*Primary Examiner* — Tony Mahmoudi
*Assistant Examiner* — Erich Alexander Fischer
(74) *Attorney, Agent, or Firm* — Patterson + Sheridan, LLP (57) ABSTRACT

Techniques for dynamically detecting objects that are out of sync in an active mirrored environment are provided. A request is received at a local node of an active mirroring environment from a system function to perform a change operation on an object. Upon determining that the object is OOS, it is determined whether the local node or a remote node of the active mirroring environment has the most recent changes for the object. In one embodiment, the determination includes analyzing corresponding time stamps of changes listed in a repository of changes for objects in the mirrored environment. Upon determining that a remote node has the most recent changes for the object, a blocking attribute is set and the requested operation on the object blocked. However, upon determining that the local node has the most recent changes for the object, a tracking attribute is set and the requested operation allowed.

18 Claims, 4 Drawing Sheets

METHOD TO DYNAMICALLY DETECT OBJECTS OUT OF SYNC IN AN ACTIVE MIRRORING ENVIRONMENT

BACKGROUND

The present invention relates to active mirroring environments, and more specifically, to dynamically detecting objects that are out of sync in such environments.

In an active mirrored environment where all changes to any mirrored object are synchronously replicated to the other node, it is necessary to determine when an individual object becomes out of sync for any reason. However, such a determination should not negatively affect the remainder of the objects in the mirroring environment which are still actively replicating.

Mirrored objects may become out of sync due to a variety of both normal and abnormal reasons. For example, objects being restored from saved media can become temporarily out of sync as the objects are restored onto a node, but prior to the restored data being resynchronized to the other node. Additionally, one or more objects that are being added to the mirroring environment may experience a window of time where an object that has just been added to a first system node of the mirrored pair is temporarily out of sync with the second system node of the mirrored pair as the object or objects are resynchronized. Finally, for example, objects may fall out of sync if an unexpected error occurs that results in changes made to an object on a first node of the mirrored pair failing to be completely replicated on the second node of the mirrored pair. While these changes to the first node are tracked until they are resynchronized, the object is treated as being out of sync.

Moreover, in the general operation of an active-active mirroring environment, where all databases stored are wholly in sync and immediately updated as to any changes, there should not be any objects out of sync. The fact that there are, is a result of one of the scenarios described above. Additionally, for objects that have become out of sync, the mirroring environment is designed to quickly resynchronize them, and return to the normal state of affairs where no objects are out of sync. As a result, time intervals during which an object is actually out of sync are short, and dynamic.

Conventionally, when a database stored on a pair of system nodes in a mirrored environment is tagged as "blocked", no changes may be made to it. This occurs when one database is varied off, for example, before its counterpart is varied off. This is disadvantageous, as only a small fraction of the objects stored within it that are out of sync relative to the other copy thus control its status (although in modern computing scenarios this small fraction of objects may be large in number). This standard approach also then requires all changes to the "tracked" counterpart of the database on the other node of the mirroring environment to be registered. While this makes sense when an entire database is taken offline, it does not make sense when both are active, yet a small number of objects are out of sync between the two copies of the database.

Methods are thus desired for dynamically detecting objects that are out of sync (OOS) in an active mirrored environment, and dealing with them precipitously, while allowing all other in sync objects of the database to continue to be changed and immediately replicated.

SUMMARY

According to one embodiment of the present disclosure, a method is provided. The method includes receiving a request at a local node of an active mirroring environment from a system function to perform a change operation on an object. Upon determining that the object is out of sync, the method further includes determining whether the local node or a remote node of the active mirroring environment has the most recent changes for the object. The method further includes upon determining that the local node has the most recent changes for the object, setting a tracking attribute and allowing the operation, or, upon determining that the remote node has the most recent changes for the object, setting a blocking attribute and blocking the operation.

In embodiments, the method further includes prior to determining if the object is out of sync, determining if the object is a mirrored object by checking a configuration information repository entry for the object. This advantageously allows a quick check of any object that is based on one or more data repositories available to each system node on the mirrored pair of nodes that provides a status for any object stored, or to be stored, in the mirroring environment.

In embodiments, a second data repository that may be used is a repository of changes to mirrored objects. In such embodiments, determining that an object is out of sync further includes determining that one or more entries for the object exist in a repository of changes to mirrored objects for the mirroring environment. If such entries exist, that means the object is in fact out of sync. Moreover, in embodiments this aspect may also be performed using an advantageous quick check. In general operation of an active-active mirroring environment, where all databases stored are wholly in sync and immediately updated as to any changes, there will not be any objects out of sync, and thus this second data registry should be empty. In such embodiments, the existence, or more precisely, non-existence, of any entries at all may first be ascertained, prior to determining, if there are entries, to which objects those entries refer. Thus, advantageously, in most cases, an object may be determined to be in sync by a quick high-level view of this second data registry being empty, allowing in such large majority of cases, the change operation to proceed on the local node receiving a request to perform the change operation.

In embodiments, if it is determined on a quick first pass that the second data registry is not empty, but does have some entries, it is necessary to determine if the object under analysis has entries therein, and if so, which node of the two system nodes of the mirroring environment has the most recent version of the object. In embodiments, this may advantageously be performed by analyzing corresponding time stamps of the tracked changes to that object listed in the repository of changes.

When an object is both out of sync and blocked, in embodiments, the method further includes setting a blocking attribute, sending an indication of the blocking attribute back to the requesting system function and returning all subsequent requests for change operations back to a requesting system function as un-executable. In embodiments, the attribute may be metadata associated with the version of the object stored on the node performing the method. Thus, in embodiments, the attribute may be interpreted differently if being accessed from the local node (where the object is, and thus change operations to the object are, now blocked), or from the remote node, where it is not blocked, just tracked.

In embodiments, when the object is out of sync, but is active on the local node, and thus tracked, the method may further include sending an indication of the tracking attribute back to the requesting system function and tracking and allowing all subsequent requests for change operations on the local node. Advantageously, this facilitates continued operations on the object, with proper procedures in place to capture all of those changes. Because, in embodiments, the tracking is recorded in the second data repository, which is globally accessible to both nodes, a record of all the tracked changes is actually available on the remote node, due to replication of the repository of changes to mirrored objects in the mirroring environment. This advantageously provides a backup to the data needed for resynchronization.

Because the method of the first embodiment of the present disclosure operates only on objects that are both mirrored objects and temporarily out of sync, on an object by object basis, in an embodiment the method further includes continuing to execute and replicate requests to perform a change operation on any object that is in sync, which will be the case for the vast majority of objects.

According to a second embodiment of the present disclosure, a computer-readable storage medium is provided. The computer-readable storage medium has computer-readable program code embodied therewith, the computer-readable program code executable by one or more computer processors to perform an operation. The operation includes receiving a request at a local node of an active mirroring environment from a system function to perform a change operation on an object. Upon determining that the object is out of sync, the operation further includes determining whether the local node or a remote node of the active mirroring environment has the most recent changes for the object. The operation further includes upon determining that the local node has the most recent changes for the object, setting a tracking attribute and allowing the operation, or, upon determining that the remote node has the most recent changes for the object, setting a blocking attribute and blocking the operation.

In embodiments, because the operation of the second embodiment of the present disclosure operates only on objects that are both mirrored objects and temporarily out of sync, on an object by object basis, and only a mirrored object can actually be out of sync, in an embodiment the operation further includes prior to determining if the object is out of sync, determining if the object is a mirrored object by checking a configuration information repository entry for the object.

When an object is both out of sync and blocked, in embodiments, the operation further includes setting a blocking attribute, sending an indication of the blocking attribute back to the requesting system function and returning all subsequent requests for change operations back to a requesting system function as un-executable. In embodiments, the attribute may be metadata associated with the version of the object stored on the node performing the method. Thus, in embodiments, the attribute may be interpreted differently if being accessed from the local node (where the object is, and thus change operations to the object are, now blocked), or from the remote node, where it is not blocked, just tracked.

In embodiments, when the object is out of sync, but is active on the local node, and thus tracked, the operation may further include sending an indication of the tracking attribute back to the requesting system function and tracking and allowing all subsequent requests for change operations on the local node. Advantageously, this facilitates continued operations on the object, with proper procedures in place to capture all of those changes. Because, in embodiments, the tracking is recorded in the second data repository, which is globally accessible to both nodes, a record of all the tracked changes is actually available on the remote node, due to replication of the repository of changes to mirrored objects in the mirroring environment. This advantageously provides a backup to the data needed for resynchronization.

According to a third embodiment of the present disclosure, a system is provided. The system includes one or more computer processors, and a memory containing a program which when executed by the one or more computer processors performs an operation. The operation includes receiving a request at a local node of an active mirroring environment from a system function to perform a change operation on an object. Upon determining that the object is out of sync, the operation further includes determining whether the local node or a remote node of the active mirroring environment has the most recent changes for the object. The operation further includes upon determining that the local node has the most recent changes for the object, setting a tracking attribute and allowing the operation, or, upon determining that the remote node has the most recent changes for the object, setting a blocking attribute and blocking the operation.

In embodiments, because the operation of the second embodiment of the present disclosure operates only on objects that are both mirrored objects and temporarily out of sync, on an object by object basis, and only a mirrored object can actually be out of sync, in an embodiment the operation further includes prior to determining if the object is out of sync, determining if the object is a mirrored object in the first place by checking a configuration information repository entry for the object.

In an embodiment, the operation, in determining that the object is out of sync, further includes determining that one or more entries for the object exist in the repository of changes to mirrored objects (also referred to herein as the "MO changes repository"). Moreover, the operation, in determining whether the remote node or the local node has the most recent changes for the object further includes analyzing corresponding time stamps of changes listed in the MO changes repository.

In an embodiment, because the operation of the system of the third embodiment of the present disclosure operates only on objects that are both mirrored objects and temporarily out of sync, on an object by object basis, and only a mirrored object can actually be out of sync, in an embodiment the operation further includes prior to determining if the object is out of sync, determining if the object is a mirrored object in the first place by checking a configuration information repository entry for the object.

DETAILED DESCRIPTION

Embodiments of the present disclosure provide techniques for dynamically detecting objects that are OOS in an active mirrored environment. Such embodiments detect a temporary state of being out of sync, and respond appropriately, on an object by object basis. In such embodiments, a request is received at a local node of an active mirroring environment from a system function to perform a change operation on an object. Upon determining that the object is OOS, it is determined whether the local node or a remote node of the active mirroring environment has the most recent changes for the object. In one embodiment, the determination includes analyzing corresponding time stamps of changes listed in a global repository of changes for objects in the mirrored environment. Upon determining that a remote node has the most recent changes for the object, a blocking attribute is set and the requested operation on the object blocked. However, upon determining that the local node has the most recent changes for the object, a tracking attribute is set and the requested operation allowed. In some embodiments, advantageously, the status of an object, and thus whether it is out of sync, and whether, on the given node, the object is to be temporarily tracked or blocked, is done in response to each and any change operation requested by a system function for the object. This processes every object dynamically, and captures, and responds to the rapidly changing status of any out of sync objects in efficient HA mirroring environments.

As noted above, mirrored objects within a mirrored environment may become OOS for various reasons. In such cases, it is useful to continue to allow a currently OOS mirrored object to be used by an application locally, on a local system node, but all changes to the object indicated on the local system node must be tracked so that they may eventually be resynchronized to the other, remote system node. Moreover, at the same time, any changes must be prevented from occurring to the mirrored object on the remote system node. This is when the version of the object on that other system node, e.g., the remote system node, is OOS, and may contain stale or old data relative to the version on the local node. Thus, transactions initiated by an application on the remote node against that older version of the mirrored object, i.e., the version of the object on the remote node, must be blocked from progressing until all of the tracked changes documented at the local node have been resynchronized to the remote node. Conversely, if the version of a mirrored object on the local node of the mirroring environment is not the most recent version, and there are changes which have more recently been made to the version of the object on the remote node, then no changes to the object requested by a system function on the local node may be allowed, and must be blocked. On the remote node changes are allowed but must be logged and tracked so that they may eventually be resynchronized to the version of the object on the local system node.

In one or more embodiments of the present disclosure, rules are to be applied to OOS objects without suspending or interrupting active replication for any of the other objects of the active mirroring environment that still remain in sync.

Figure 1:
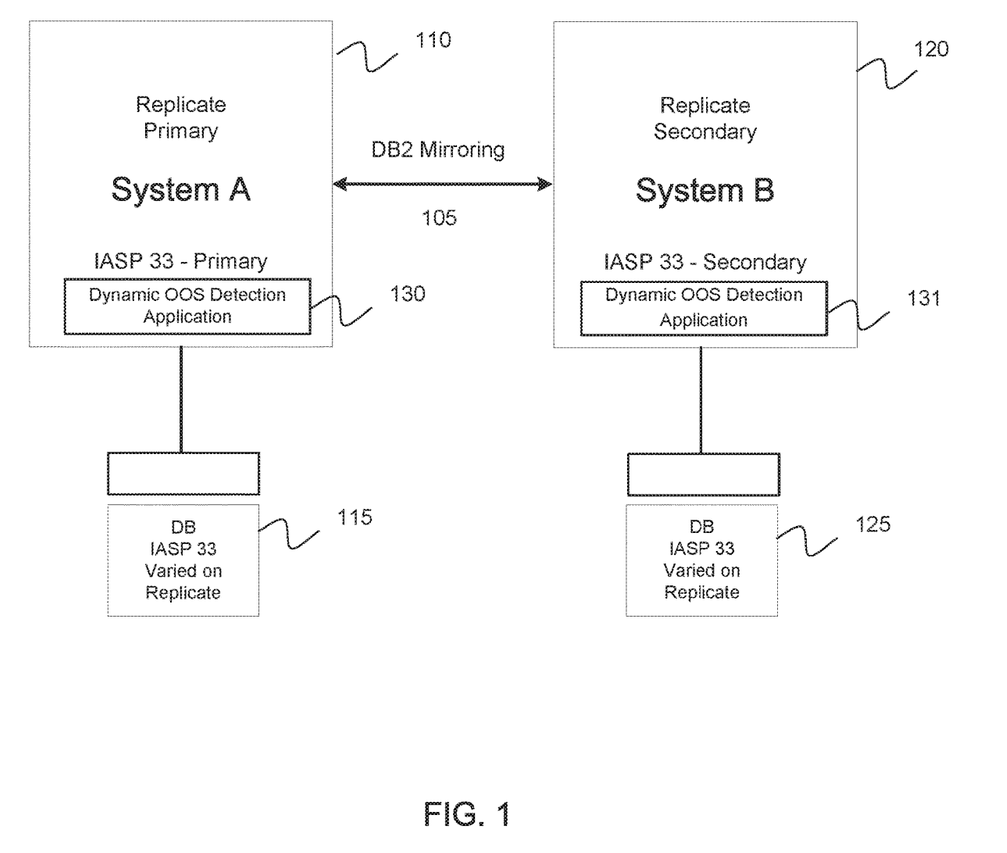
FIG. 1 illustrates an example pair of nodes in a mirrored environment, according to one embodiment disclosed herein.

FIG. 1 illustrates an example mirroring environment, according to one embodiment disclosed herein. With reference to FIG. 1, there is shown a first example system node 110, System A, and a second example system 120, System B. System A 110 and System B 120 are in a mirroring environment, as shown by arrow 105. A mirroring environment is a continuous availability solution which offers the ability to keep database files synchronized between two nodes and can provide a recovery time objective close to zero. As shown in FIG. 1, the mirroring environment may be the "Db2 Mirror" solution provided by IBM Corporation. In such an embodiment immediate replication of data across System A 110 and System B 120, such as, for example, objects and data within the two copies of database IASP 33, described below, is managed by a Db2 mirroring engine. Thus, as shown, stored on each of System A 110 and System B 120, respectively, is a copy of a database. In the illustrated embodiment, the database is an independent auxiliary storage pool (IASP), which is a collection of disk units that can be brought online or taken offline and kept independent of the rest of the data on a storage system. The example database in FIG. 1 is labeled "IASP 33." As shown in FIG. 1, one copy of IASP 33 115 is stored on System A 110, and a second copy of IASP 33 125 is stored on System B 120. Due to the mirroring environment, the two copies 115, 125 are in sync and identical, indicated by the term "replicate" appearing on each of the two copies of IASP 33 115, 125. Thus a change made by a user on System A to IASP 33 115, is immediately replicated on IASP 33 125 stored on System B. Both copies of IASP 33 are in an active state, which means they are each available to be changed, and, as noted, any change to one is replicated to the other. The fact that they are on and operative on their two respective systems is indicated by the term "varied on" as shown on each copy of IASP 33 115, 125.

Continuing with reference to FIG. 1, System A and System B are each provided with dynamic OOS detection application 130 and 131, respectively. Dynamic OOS detection application 130, 131 facilitates identification of any mirrored objects of the mirrored pair comprising system nodes 110 and 120 that may have become OOS. The elements and functionality of dynamic OOS detection application 130, 131 are described more fully below, with reference to FIG. 2.

Figure 2:
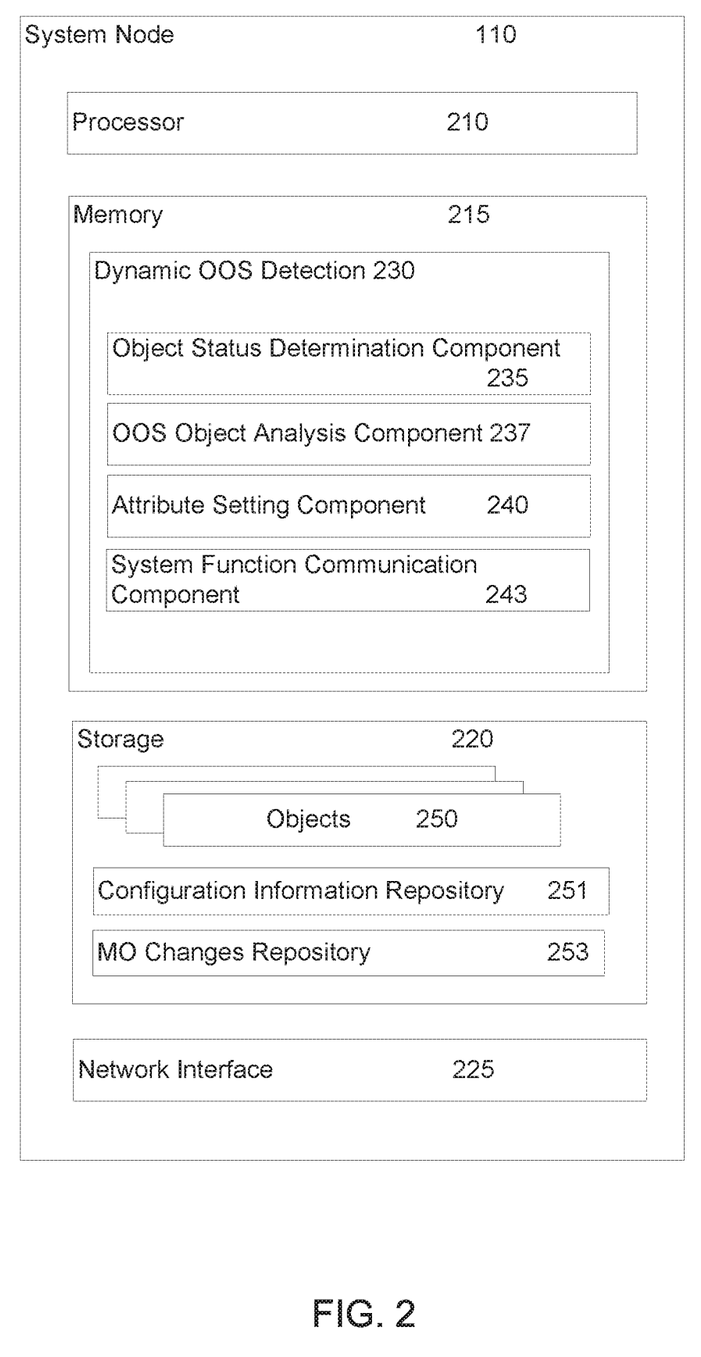
FIG. 2 is a block diagram illustrating detail of one of the example nodes of the mirrored environment of FIG. 1 configured to execute dynamic OOS detection, according to one embodiment disclosed herein.

FIG. 2 is a block diagram illustrating an example System Node 110 configured to provide dynamic OOS detection, according to one embodiment disclosed herein. In the illustrated embodiment, the System Node 110 includes a Processor 210, Memory 215, Storage 220, and a Network Interface 225. In the illustrated embodiment, the Processor 210 retrieves and executes programming instructions stored in Memory 215, as well as stores and retrieves application data residing in Storage 220. The Processor 210 is generally representative of a single CPU, multiple CPUs, a single CPU having multiple processing cores, and the like. The Memory 215 is generally included to be representative of a random access memory. Storage 220 may be disk drives or flash-based storage devices, and may include fixed and/or removable storage devices, such as fixed disk drives, removable memory cards, or optical storage, network attached storage (NAS), or storage area network (SAN). Storage 220 may include one or more data bases, including IASPs. Via the Network Interface 225, the System Node 110 can be communicatively coupled with one or more other devices and components, such as other System Nodes 110, monitoring nodes, storage nodes, and the like.

In the illustrated embodiment, the Storage 220 includes a set of Objects 115. Although depicted as residing in Storage 220, in embodiments, the Objects 115 may reside in any suitable location. In embodiments, the Objects 115 are generally representative of any data (e.g., application data, saved files, databases, and the like) that is maintained and/or operated on by the System Node 110. As noted, Objects 115 may include IASP 33 of FIG. 1. As illustrated, the Memory 215 includes a Dynamic OOS Detection Application 230. Although depicted as software in Memory 215, in embodiments, the functionality of the Dynamic OOS Detection Application 230 can be implemented in any location using hardware, software, or a combination of hardware and software. Although not illustrated, the Memory 215 may include any number of other applications used to access, read, create, delete and modify the Objects 115 and perform other tasks on the System Node 110.

In the illustrated embodiment, Storage 220 also includes two data repositories, the Configuration Information Repository 251, and the mirrored object (MO) Changes Repository 253. These repositories may be implemented in any appropriate data structure that allows for quick and efficient determination of the status of a given object of Objects 250. In the illustrated embodiment, both of these repositories exist on each node within the mirrored environment. Thus, they are accessible from either node without having to incur overhead of communicating with the remote node in order to obtain or otherwise determine this information. In one embodiment, both of these repositories may be replicated and managed on an ongoing basis by a Db2 mirroring engine, as indicated in FIG. 1. In one embodiment, the repositories may comprise SQL tables, which are built and managed by a Db2 mirroring system.

In the illustrated embodiment, the Configuration Information Repository 251 is used by all system functions to determine if a given object of Objects 250 is a mirrored object. When an operation regarding a change to any object is requested by an application running on System Node 110, the first thing that occurs is a query to the Configuration Information Repository 251 to determine if the referenced object is a MO. Thus, in the illustrated embodiment, every operation that may deal with a replicated object needs to first determine if the object is subject to replication, and, if it is, then mirroring protocols for that object must be followed. In response to the query, the replication status of the object is returned. If the status of the object is that it is a mirrored object, then additional details specifying how the mirrored object should be treated within the mirrored environment are also returned with the object's status.

In the illustrated embodiment, this additional information indicates if the requested operation against the mirrored object can be replicated immediately, or if the operation should be tracked (or blocked) because the system nodes of the mirroring environment are currently suspended and thus unable to replicate any of the changes to the other node of the mirroring environment.

As illustrated, Storage 220 also includes a MO Changes Repository 253. This repository lists changes to mirrored objects that need to be tracked, for example, on the local node and resynchronized to the remote node once the nodes are able to resume mirroring operations. In one embodiment, the MO Changes Repository 253 includes, with each listed change, which node of the two nodes in the mirroring environment requested the change, and when. Objects listed within this repository are considered OOS with the mirrored version of the object on the remote node until the changes listed in this repository have been resynchronized to that other version of the object (i.e., the version of the object on the remote node). As described in detail below, in embodiments, which node is blocked from further changes to its local version of an OOS object, and similarly, which node is allowed to make further changes to its local version of the OOS object, depends upon which node has the most recent changes to the OOS object listed in the MO Changes Repository 253. In one embodiment, this may be determined by analyzing time stamps or other temporal indications corresponding to the changes listed in the MO Changes Repository 253.

As illustrated, the Dynamic OOS Detection application 230 includes an Object Status Determination Component 235, an OOS Object Analysis Component 237, an Attribute Setting Component 240 and a System Function Communication Component 243. Although depicted as discrete components for conceptual clarity, in embodiments, the operations and functionality of Object Status Determination Component 235, OOS Object Analysis Component 237, Attribute Setting Component 240 and System Function Communication Component 243 may be combined or distributed across any number of components. In an embodiment, the Dynamic OOS Detection application 230 is generally used to implement, communicate regarding, and manage the dynamic determination of OOS objects and how they are handled while OOS in the active mirroring environment.

In an embodiment, the Object Status Determination Component 235 accesses the Configuration Information Repository 251 in Storage 220 to determine whether an object that is the subject of a change operation request is a mirrored object. If it is, then the Object Status Determination Component 235 so informs the OOS Object Analysis Component 237, which proceeds to determine whether the object is OOS. In an embodiment, if the object is in fact OOS, then the OOS Object Analysis Component 237 so informs the Attribute Setting Component 240, which determines which node, between the local node and the remote node of the mirroring environment, has the most recent copy of the object, and, as a result, which node may make further changes to its version of the object, and which node should be blocked form making changes to its version of the object. Besides making this determination and thus setting short term handling policy for the object, the Attribute Setting Component 240, by setting an appropriate attribute (e.g., "track and log" or "block"), informs system functions how the object is to be handled on the current node while it is in the OOS state. In an embodiment, when the object is resynchronized, the Attribute Setting Component 240 then desets, or deletes, the attribute.

Thus, in an embodiment, depending upon the determination of the Attribute Setting Component 240, change operations on or against a MO, or, for example, change operations which include the MO, may proceed with tracking, or alternatively, must be blocked.

In an embodiment, the Attribute Setting Component 240 communicates with system functions operating on the System Node 110 via the System Function Communication Component 243. Thus, when the Attribute Setting Component 240 sets an attribute, or when the Attribute Setting Component 240 determines a policy regarding a requested change operation, the attribute and the policy are communicated to a requesting system function via the System Function Communication Component 243.

Figure 3:
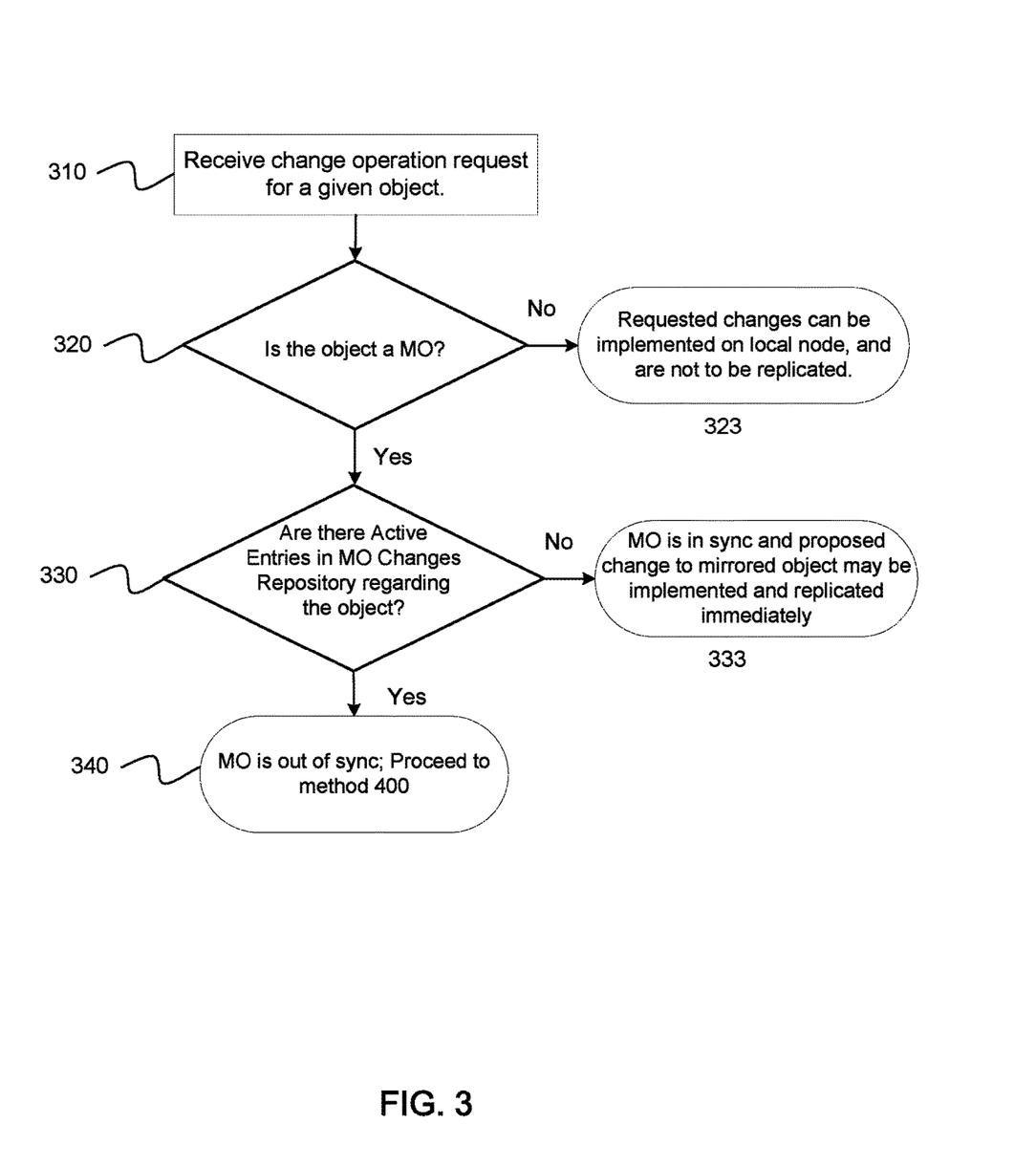
FIG. 3 is a flow diagram illustrating a method to detect if an object is OOS, according to one embodiment disclosed herein.

FIG. 3 is a flow diagram illustrating a method 300 to detect if an object is OOS, according to one embodiment disclosed herein. Method 300 includes blocks 310 through 340. In alternate embodiments method 300 may have more, or fewer, blocks.

Continuing with reference to FIG. 3, method 300 begins at block 310, where a change operation request is received for a given object. As noted above, a change operation is an operation that includes one or more of create, insert, modify or delete processes on an object or a portion of an object, such as a row or column of from a table object, for example. The request at block 310 is received, for example, by a rules engine of a system node from a system function. The rules engine includes a dynamic OOS detection component, for example.

From block 310 method 300 proceeds to query block 320, where it is determined whether the object which is referred to in the requested change operation is a mirrored object. In embodiments, users may define which objects on a system node of an active mirroring environment are to be mirrored, and thus replicated to the other system node of the active mirroring environment. For example, an enterprise may, to balance workloads, assign 50 out of its 100 customers to be serviced by one node, and the other 50 to be serviced by the other node. Customer specific temporary data for a customer assigned to be serviced by a primary node would thus not need to be replicated to the second node of the active mirroring environment. Objects which embody, or include, such customer specific data would thus not need to be MOs, and thus would return a status of "not mirrored."

Continuing with reference to FIG. 3, if the response at query block 320 is "No", then method 300 proceeds to terminating block 323, and requested changes can be implemented on the local node, but, given that the object is not a MO, are not to be replicated. If, however, the response at query block 320 is "Yes", then method 300 proceeds to query block 330, where it is determined whether there are active entries in the MO Changes Repository (described above with reference to FIG. 2) for the object. It is here noted that in an active mirroring environment, the MO Changes Repository should generally be empty. It is only when one of the OOS scenarios occurs, as described above, that one version of an object, on one system node, is blocked, and the other version, on the other system node, is tracked. In embodiments, at block 330, as a first check, it can be determined if there are any active entries in the MO Changes Repository at all, without knowing for which objects. If there are none, then all objects in the environment are currently actively replicating, and the response at block 330 is "No." Alternatively, if there are active entries in the MO Changes Repository, then in a more detailed second pass it is determined if those entries implicate the object referenced at block 310.

Thus, if the response at query block 330 is "No", whether determined at the first quick pass, or at a more detailed analysis of the contents of the MO Changes Repository, then method 300 proceeds to termination block 333, where it is confirmed that the object, although a MO, is in fact in sync across the two nodes of the mirroring environment, and therefore the proposed change operation on the object may be implemented, and replicated immediately to the other node.

Continuing with reference to FIG. 3, if the response at query block 330, however, is "Yes", then method 300 proceeds to terminating block 340, where it is determined that the referenced object is OOS, and further processing is required to handle the object on this node. That further processing is embodied in method 400 of FIG. 4, next described.

Figure 4:
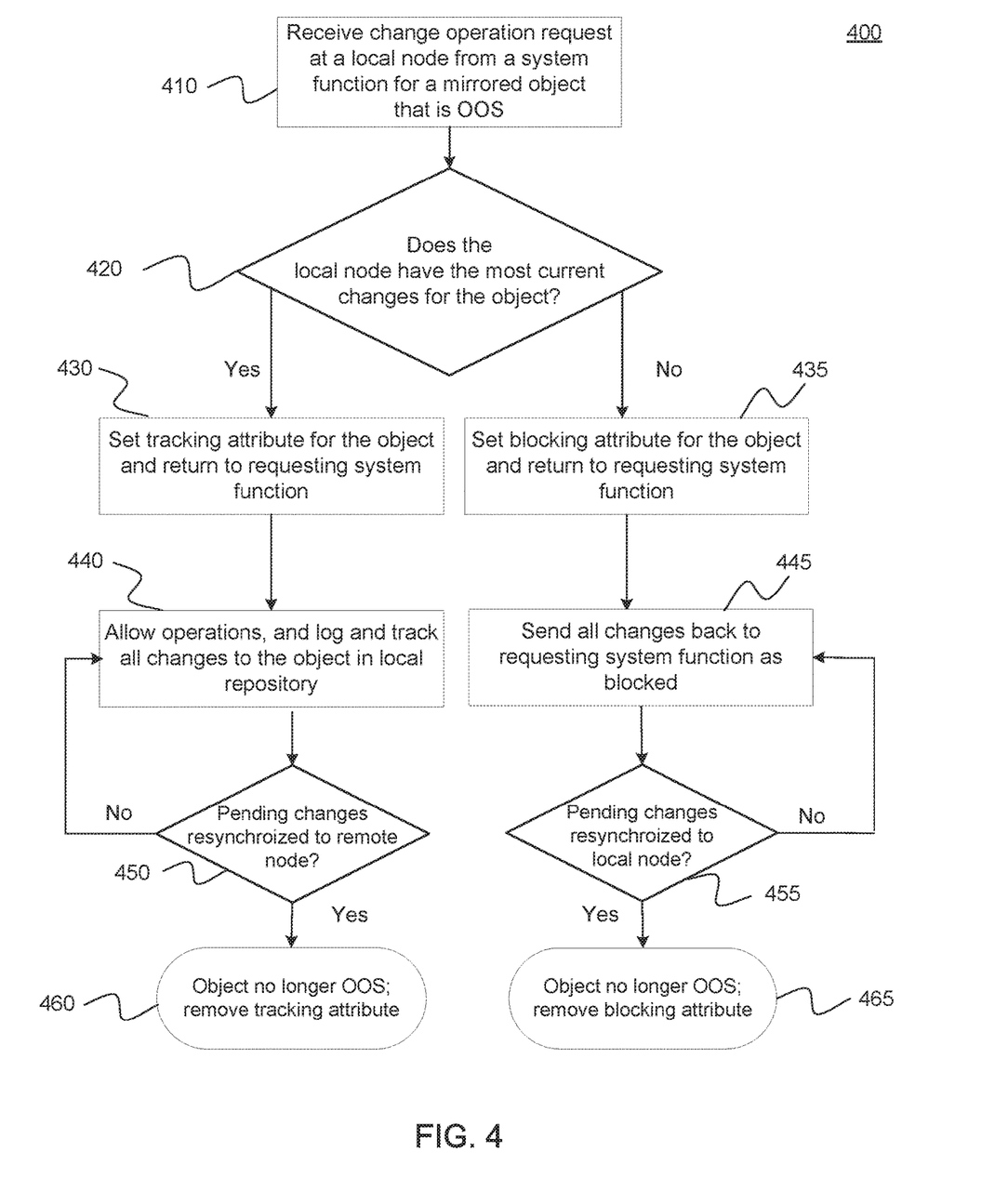
FIG. 4 is a flow diagram illustrating a method of handling an OOS object, according to one embodiment disclosed herein.

FIG. 4 is a flow diagram illustrating a method 400 of handling an OOS object, according to one embodiment disclosed herein. Method 400 includes blocks 410 through 465. In alternate embodiments method 400 may have more, or fewer, blocks.

Continuing with reference to FIG. 4, method 400 begins at block 410, where a change operation request is received at a local node from a system function running on the local node for a mirrored object that is now OOS. This block picks up where method 300 ended, at termination block 340 of FIG. 3, where it was determined that the object is OOS. From block 410, method 400 proceeds to block 420, where it is determined whether the local node has the most current changes to, and thus has the most current version of, the object.

From query block 420, method 400 bifurcates along two parallel paths. The path on the left side of FIG. 4 results from a "Yes" response at query block 420, and the path on the right side of FIG. 4 results from a "No" response at query block 420. The "Yes" path will be described first. A "Yes" in response to the query block indicates that the local copy of the object is the most recent, and thus the local system node is allowed to continue modifying the object. Continuing with reference to FIG. 4, in response to a "Yes" at query block 420, method 400 proceeds to block 430, where a tracking attribute is set for the object and returned to the requesting system function. For example, the requesting system function may be advised of the attribute value, and thus the policy in the short term of logging and tracking all changes to the object, via the System Function Communication Component 243 of the Dynamic OOS Detection application 230, both as shown in FIG. 2, and described above.

It is noted that the tracking and blocking attributes are essentially metadata associated with the version of the object stored on an individual node. Thus, in embodiments, an attribute may be set or interpreted differently if the object is being accessed from the local node, or from the remote node, of the mirroring environment. In embodiments, the metadata attribute itself may be stored (e.g., cached) along with all other metadata associated with an object. In embodiments, this may be implemented in three ways, for example. First, for example, this may include a system catalog entry associated with an object. Second, the attribute may be within the object itself. Thirdly, for example, a method or operation according to the present disclosure may dynamically re-determine the attribute upon each change operation request from a system function.

Thus, the first two example approaches would utilize the tasks at blocks 430, 450 and 460 to set and reset (i.e., remove) a cached tracking attribute, or at blocks 435, 455 and 465, to set and reset a cached blocking attribute. However, in the third example approach, a method or operation according to the present disclosure may dynamically recalculate the value of the attribute each time, and thus the tasks at blocks 450, 455, 460 and 465 would not need to be implemented. This is because in the example approach where the value of the attribute is dynamically recalculated each time, if the object has been resynchronized then the response to query block 330 would be a "No", and there would then be no need to proceed. In other words, in this example approach, it is not necessary to read an attribute, rather just to run the tests at query blocks 320 and 330 of FIG. 3 in response to any new change operation request. Advantageously, all three options may be used, as may best fit a given design. In designs where processing of the tasks of method 300 is optimized, the approach of dynamic recalculation described above may be implemented, and thus method 400 of FIG. 4 would end at blocks 440 and 445, respectively, and not perform blocks 450 and 460, on the "track" path, or blocks 455 and 465, on the "blocked" side, of FIG. 4.

From block 430, method 400 proceeds to block 440, where the requested operation at block 410 is allowed, but all changes to the object must be logged and tracked in the local repository, a policy which continues until those changes can be resynchronized and the repository updated.

Thus, to test for this condition, from block 440 method 400 proceeds to query block 450, where it is determined if all pending changes listed in the local repository have been resynchronized to the remote node. If "Yes" at query block 450, then method 400 proceeds to termination block 460 where the object is identified as no longer OOS, and the tracking attribute, set at block 430, is removed. The object is now actively replicating, and fully in sync. However, if the condition is not satisfied yet, and the response at query block 450 is "No" then method 400 loops back to block 440, and continues in logging and tracking mode for the indicated object, on the local system node.

On the other hand, continuing with reference to FIG. 4, in response to a "No" at query block 420, method 400 proceeds to the pathway on the right side of FIG. 4, beginning with block 435, where a blocking attribute is set for the object and returned to the requesting system function. In some embodiments the blocking attribute may be a flag in a table or other data structure. In other embodiments, however, it is just as efficient to process all change requests from system functions as described above, and detect if the object is a MO, and then if the object should be blocked, in response to each change operation request received. Advantageously, given that in embodiments it is desirable to quickly clear any tracked changes for a given object by resynchronization, and thus clearance of all entries for that object in the MO changes repository, a given object's status can quickly change return to normal "sync." As a result, in such embodiments, there is no need to set a flag and read the flag. Rather, simply to check the repositories anew in response to each change operation request, the MO changes repository being the quickest way to ascertain an object's status.

In embodiments, setting the attribute and notifying the system function may be performed, as noted above, for example, via the System Function Communication Component 243 of the Dynamic OOS Detection application 230, both as shown in FIG. 2, and described above, informing the requesting system function of the attribute value, and thus the policy in the short term of all changes being blocked as regards the object, until further notice.

This is because a "No" in response to query block 420 indicates that the local copy of the object is not the most recent, but rather the copy of the object on the remote system node is the more recent. Thus, the local system is blocked from further changes to the object.

From block 435, method 400 proceeds to block 445, where the requested operation at block 410, and all further requested change operations to the object, are disallowed, a policy which continues until the changes logged and tracked on the remote node can be resynchronized to the current local node. Thus, to test for this condition, from block 445 method 400 proceeds to query block 455, where it is determined if all pending changes listed in the remote repository have been resynchronized to the present, local node. If "Yes" at query block 455, then method 400 proceeds to termination block 465 where the object is identified as no longer OOS, and the blocking attribute, set at block 430, is removed. The object is now actively replicating, and fully in sync.

However, if the condition is not satisfied yet, and the response at query block 455 is "No" then method 400 loops back to block 445, and continues in blocking mode for the indicated object, on the local system node.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., Dynamic OOS Detection 230 shown in FIG. 2) and related data (e.g., the contents of Configuration Information Repository 251, and MO Changes Repository 253, also shown in FIG. 2) available in the cloud. For example, the Dynamic OOS Detection application could execute on a computing system in the cloud and detect and manage OOS objects in cloud based active mirroring environments. In such a case, the OOS object detection application could monitor ongoing replication interactions to identify whether an OOS scenario has occurred in any active mirroring environment and store an indication of such occurrence, and the response thereto by the application on the two nodes of the active mirroring environment at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving a first request at a local node of an active mirroring environment, from a system function, to perform a first change operation on a first object, wherein the active mirroring environment comprises a plurality of remote databases in which a change to a first database, comprising the local node, is replicated to a second database, comprising a remote node, upon receiving the change at the first database;
identifying a repository of changes relating to the active mirroring environment, wherein the repository of changes is accessible to both the first database and the second database and wherein the repository of changes reflects changes for all mirrored objects in the active mirroring environment;
determining that the repository of changes is empty, and in response determining that the first object is in sync;
receiving a second request at the local node to perform a second change operation on a second object;
determining that the repository of changes is not empty, and in response:
determining that the second object is out of sync based on determining that the repository of changes includes an entry relating to the second object;
upon determining that the second object is out of sync:
determining whether the local node or the remote node of the active mirroring environment has the most recent changes for the second object based on analyzing the repository of changes, wherein the repository of changes reflects a plurality of changes relating to the second object, comprising:
identifying one or more temporal indications, in the repository of changes, relating to changes by at least one of the local node or the remote node; and
determining whether the local node or the remote node of the active mirroring environment has the most recent changes for the second object based on identifying which node is associated with the most recent temporal indication in the repository of changes; and
at least one of:
upon determining that the local node has the most recent changes for the second object, setting a tracking attribute relating to the second object and allowing the operation; or
upon determining that the remote node has the most recent changes for the second object, setting a blocking attribute relating to the second object and blocking the operation.

2. The method of claim 1, further comprising, prior to determining that the first object is in sync, determining if the first object is a mirrored object by checking a configuration information repository entry for the first object.

3. The method of claim 1, wherein the most recent temporal indication comprises a time stamp of changes.

4. The method of claim 1, wherein setting a blocking attribute further comprises sending an indication of the blocking attribute back to a requesting system function for the second request and returning all subsequent requests for change operations back to a respective requesting system function as un-executable.

5. The method of claim 4, further comprising upon determining that all pending changes have been resynchronized to the local node, removing the blocking attribute.

6. The method of claim 1, wherein setting a tracking attribute further comprises sending an indication of the tracking attribute back to a requesting system function for the second request and tracking and allowing all subsequent requests for change operations on the local node.

7. The method of claim 6, further comprising upon determining that all pending changes have been resynchronized to the remote node, removing the tracking attribute.

8. The method of claim 1, wherein the first change operation includes an operation directing at least one of creating, updating, inserting into or deleting the object.

9. The method of claim 1, further comprising continuing to execute and replicate requests to perform change operations on an additional object that is in sync.

10. A computer-readable storage medium having computer-readable program code embodied therewith, the computer-readable program code executable by one or more computer processors to perform an operation comprising:
receiving a first request at a local node of an active mirroring environment, from a system function, to perform a first change operation on a first object, wherein the active mirroring environment comprises a plurality of remote databases in which a change to a first database, comprising the local node, is replicated to a second database, comprising a remote node, upon receiving the change at the first database;
identifying a repository of changes relating to the active mirroring environment, wherein the repository of changes is accessible to both the first database and the second database and wherein the repository of changes reflects changes for all mirrored objects in the active mirroring environment;
determining that the repository of changes is empty, and in response determining that the first object is in sync;

receiving a second request at the local node to perform a second change operation on a second object;
determining that the repository of changes is not empty, and in response:
   determining that the second object is out of sync based on determining that the repository of changes includes an entry relating to the second object;
upon determining that the second object is out of sync:
   determining whether the local node or the remote node of the active mirroring environment has the most recent changes for the second object based on analyzing the repository of changes, wherein the repository of changes reflects a plurality of changes relating to the second object, comprising:
      identifying one or more temporal indications, in the repository of changes, relating to changes by at least one of the local node or the remote node; and
      determining whether the local node or the remote node of the active mirroring environment has the most recent changes for the second object based on identifying which node is associated with the most recent temporal indication in the repository of changes; and
   at least one of:
      upon determining that the local node has the most recent changes for the second object, setting a tracking attribute relating to the second object and allowing the operation; or
      upon determining that the remote node has the most recent changes for the second object, setting a blocking attribute relating to the second object and blocking the operation.

11. The computer-readable storage medium of claim 10, the operation further comprising:
   prior to determining that the first object is in sync, determining if the first object is a mirrored object by checking a configuration information repository entry for the first object.

12. The computer-readable storage medium of claim 10, wherein the most recent temporal indication comprises a time stamp of changes.

13. The computer-readable storage medium of claim 10, wherein setting a blocking attribute further comprises sending an indication of the blocking attribute back to a requesting system function for the second request and returning all subsequent requests for change operations back to a respective requesting system function as un-executable.

14. The computer-readable storage medium of claim 10, wherein setting a tracking attribute further comprises sending an indication of the tracking attribute back to a requesting system function for the second request and tracking and allowing all subsequent requests for change operations on the local node.

15. A system, comprising:
one or more computer processors; and
a memory containing a program which when executed by the one or more computer processors performs an operation, the operation comprising:
   receiving a first request at a local node of an active mirroring environment, from a system function, to perform a first change operation on a first object, wherein the active mirroring environment comprises a plurality of remote databases in which a change to a first database, comprising the local node, is replicated to a second database, comprising a remote node, upon receiving the change at the first database;
   identifying a repository of changes relating to the active mirroring environment, wherein the repository of changes is accessible to both the first database and the second database and wherein the repository of changes reflects changes for all mirrored objects in the active mirroring environment;
   determining that the repository of changes is empty, and in response determining that the first object is in sync;
   receiving a second request at the local node to perform a second change operation on a second object;
   determining that the repository of changes is not empty, and in response:
      determining that the second object is out of sync based on determining that the repository of changes includes an entry relating to the second object;
   upon determining that the second object is out of sync:
      determining whether the local node or the remote node of the active mirroring environment has the most recent changes for the second object based on analyzing the repository of changes, wherein the repository of changes reflects a plurality of changes relating to the second object, comprising:
         identifying one or more temporal indications, in the repository of changes, relating to changes by at least one of the local node or the remote node; and
         determining whether the local node or the remote node of the active mirroring environment has the most recent changes for the second object based on identifying which node is associated with the most recent temporal indication in the repository of changes; and
      at least one of:
         upon determining that the local node has the most recent changes for the second object, setting a tracking attribute relating to the second object and allowing the operation; or
         upon determining that the remote node has the most recent changes for the second object, setting a blocking attribute relating to the second object and blocking the operation.

16. The system of claim 15, the operation further comprising:
   prior to determining that the first object is in sync, determining if the first object is a mirrored object by checking a configuration information repository entry for the first object.

17. The system of claim 15, wherein the most recent temporal indication comprises a time stamp of changes.

18. The system of claim 15, the operation further comprising:
   continuing to execute and replicate requests to perform additional change operations on an object that is in sync.

* * * * *